Jan. 4, 1966     R. K. HATHAWAY ETAL     3,227,280
FILTER
Original Filed Nov. 18, 1959
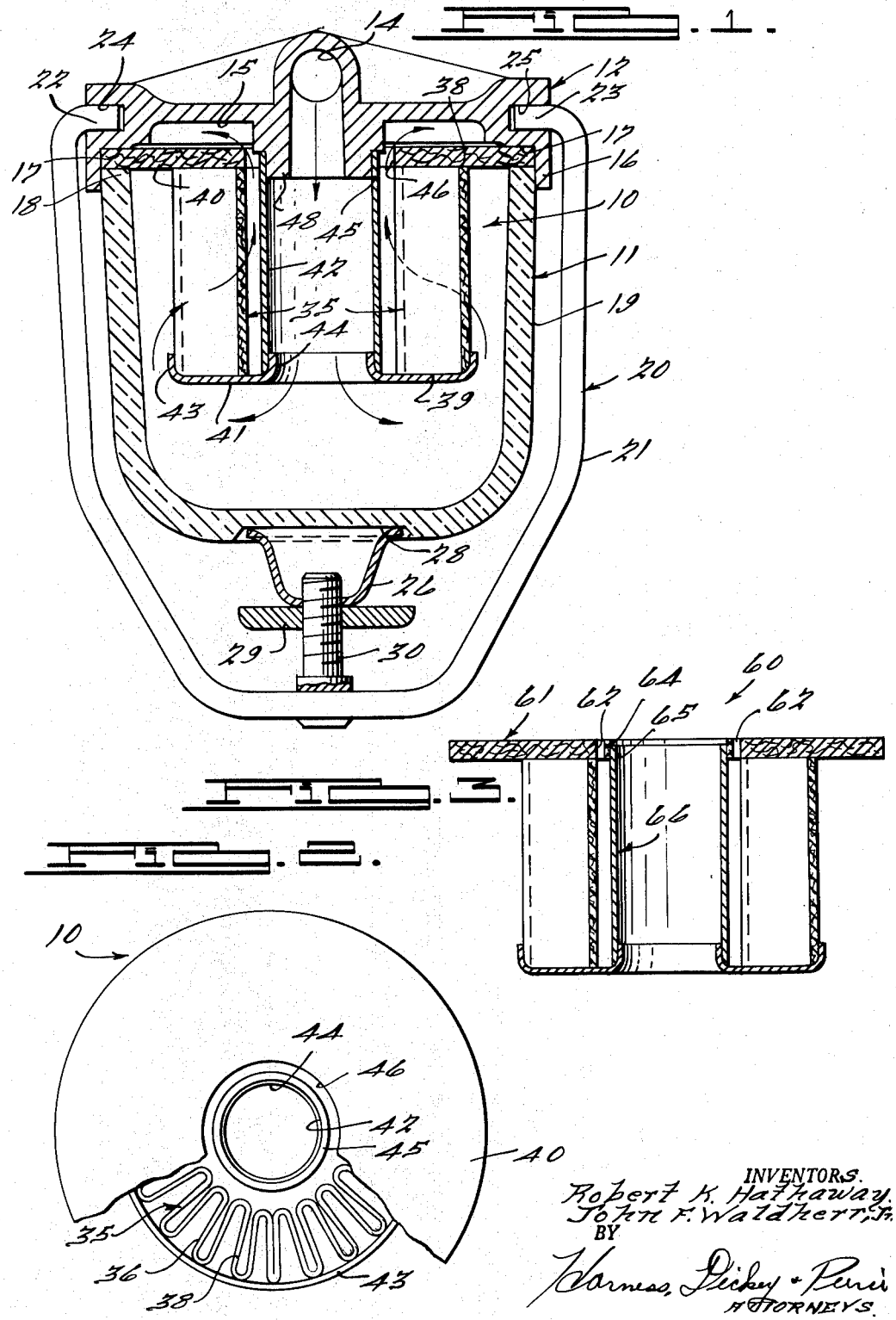
INVENTORS.
Robert K. Hathaway,
John F. Waldherr, Jr.
BY
Harness, Dickey & Pierce
ATTORNEYS.

United States Patent Office 3,227,280
Patented Jan. 4, 1966

3,227,280
FILTER
Robert K. Hathaway, Racine, and John F. Waldherr, Jr., Fond du Lac, Wis., assignors to Walker Manufacturing Company, Racine, Wis., a corporation of Delaware, and Wells Manufacturing Corporation, Fond du Lac, Wis., a corporation of Wisconsin
Continuation of application Ser. No. 853,937, Nov. 18, 1959. This application Jan. 15, 1963, Ser. No. 251,694
2 Claims. (Cl. 210—438)

This application is a continuation of application Serial No. 853,937, filed November 18, 1959, and now abandoned.

This invention relates primarily to filters, and more particularly to an improved type of filter element or cartridge that may be used in automotive fuel pumps as well as in other applications.

Filters previously used in fuel pumps have ranged from a flat, coarse screen to a cup-shaped fiber or ceramic element. None have been fully satisfactory, one reason being that there is either little filtration or low capacity and, to our knowledge, no previous design possessed the desired combination of high filtration and high capacity.

It is thus an object of the present invention to provide an improved filter element for use in the fuel pump of an internal combustion engine, and one which will remove very small particles from the fluid stream without unduly restricting fluid flow.

Another object is to provide a throw-away type pleated paper filter element for air and fluid lines of many types.

Another object of the present invention is to provide an improved filter element which can be used in the glass sediment bowls of existing fuel pumps as a substitute for the filter elements now in use.

Another object of the present invention is to provide a combination filter element and gasket which can be easily installed and assembled in the proper location as compared with existing arrangements.

An additional object of the present invention is to provide a combination filter and sealing element that cooperates in a unique manner with a conventional swing clamp on the sediment bowl of a filter pump.

Another object is to provide a filter cartridge located and designed so that fluid enters and leaves a central portion at one end thereof and which induces a sharp turn in the fluid path so as to facilitate separation of particles from the fluid stream.

Other objects and advantages of the present invention will become apparent from the following detailed description wherein reference is made to the drawings in which:

FIGURE 1 is a vertical cross-sectional view through an automotive type fuel pump sediment bowl and the improved filter element of the present invention;

FIGURE 2 is a top elevation of the filter element partially broken away to show the internal construction of the filter element; and FIGURE 3 is a cross-sectional view of a modified form of filter element wherein the center tube is supported by a combination end plate and gasket.

The filter element of the present invention comprises a pleated paper cartridge having a novel multifunction upper end cap in the form of a disc or radial flange that is larger than the diameter of the cartridge. The flange functions to properly locate and support the cartridge in operative position and also serves as a gasket to seal the joint between the sediment bowl and the supporting structure therefor. The end cap may also be used to locate and support a center tube of the cartridge. The end cap also provides both the inlet and outlet for fluid flow and the structure is arranged so that fluid must make a sharp 180° turn at the other end of the cartridge and a 90° turn at the outlet end with the result that the momentum of entrained particles will tend to separate them from the fluid at points where they can be properly collected.

Referring to FIGURE 1, an exemplary embodiment of a filter element 10 in accordance with the present invention is shown in operative association with the filter section 11 of a fuel pump. The section 11 is of conventional construction and comprises an upper housing portion 12 having an inlet aperture 14 for admitting fuel into the section 11 from a fuel tank or other component of the fuel system. The housing 12 has an annular outlet chamber 15 that communicates with the inlet side of the fuel pump section (not shown). The housing 12 has a downwardly depending peripheral rim 16 that, in cooperation with an annular seating face 17, accepts and positions the upper portion 18 of a sediment bowl 19. The sediment bowl 19 is conventionally made from glass to facilitate inspection of the filter element 10 and to determine how much dirt has been separated out of the fuel.

As is well known, the sediment bowl 19 is biased upwardly towards the seating face 17 of the housing 12 by a swing clamp 20 comprising a U-shaped wire rod 21, the end portions 22 and 23 of which are engaged in suitable recesses 24 and 25, respectively, in the housing 12. A positioning pad 26 is biased upwardly into a circular recess 28 in the bottom of the bowl 19 by a thumb screw 29 that rotates on an upstanding screw 30 that extends between the swingable wire rod 21 and the pad 26.

As shown by the arrows in FIGURE 1, fuel enters the filter housing 12 through the inlet passage 14 and flows downwardly into the bowl 19 and then after a 180° turn upwardly through the filter element 10, it then turns 90° into the annular passage 15 which leads to an outlet passage (not shown).

The filter cartridge 10 is of annular construction and filtering takes place as the fuel passes through the thickness of the filter sheet 35 which is preferably one of the treated paper-like materials now available that combines good filtration with relatively low resistance to gas or liquid flow. The material sold under the trademark "Duocron" by the Walker Manufacturing Company of Racine, Wisconsin, is very satisfactory. The filter sheet 35 is folded into a plurality of longitudinally extending pleats 36 with successive folds radially displaced from each other, and it will be seen that it has a large surface area. The upper and lower ends 38 and 39, respectively, of the pleats 36 are glued or bonded by a suitable substance, for example a plastic adhesive, to the upper and lower end caps 40 and 41, respectively, to prevent bypassing of the fuel around the filter paper 35. A center tube 42, which is of substantially smaller diameter than the inner diameter of the filter element 10 defined by the inner folds of the pleats 36, is supported by the lower cap 41. The inside of the tube 42 forms the inlet passage for fuel to be filtered and the annular space around the outside of the center tube forms the outlet passage for filtered fuel that has passed through the filter material 35.

The lower end cap 41 has its outer peripheral edge turned up in a rim 43 that locates the outer folds of the pleats 36 of the filter material 35. The inner diameter of the lower end cap 41 is turned upwardly to form a flange 44 that fits inside and is glued to the bottom end of the center tube 42. The upper end 45 of the tube 42 is unsupported and projects freely within an opening 46 in the top end cap 40. Upon installation of the filter element 10 in the filter 11, the upper end 45 of the tube 42 sealably engages a downwardly extending boss 48 on the housing 12 to insure passage of fuel downwardly through the tube 42. The tube 42 is imperforate so that fuel must pass downwardly through the tube 42, then upwardly and radially inwardly through the paper filter element 35, and then upwardly into the annular chamber 15.

It will be noted that the sharp turn that the fluid must take at the bottom of the cartridge 10 will cause some of the heavier particles to be separated out by centrifugal force. At the top of the cartridge the fuel must also make a sharp turn, and if any particles should remain in the fuel there will be a tendency for them to be separated out to drop down on the top of end cap 41.

The top end cap 40 is formed of material that can function as a gasket and preferably has the same diameter as the upper end 18 of the sediment bowl 19. Thus, the top end cap 40 properly locates the cartridge and acts as a gasket that seats on the face 17 at the base of the rim 16 on the housing 12. When upward pressure is applied to the sediment bowl 19 upon upward advancement of the clamping screw 29, the upper edge 18 on the sediment bowl 19 is biased against the end cap 40 whereupon it functions as a seal to provide a fluid-tight connection between the bowl 19 and the housing.

It is also apparent that the end cap 40 is the means by which the filter element 10 is positioned and supported within the sediment bowl 19.

If it is desired to clean the bowl 19 of sediment which may have dropped to the bottom thereof, or it if is desired to change filter elements 10, the sediment bowl 19 is unclamped by backing off the screw 29 whereupon the filter element 10 may be pulled downwardly and removed.

Referring to FIG. 3, a modified filter cartridge 60 differs from the previously described filter element 10 in that an upper end cap 61 of the cartridge 60 has a plurality of small openings 62 that provide an outlet for filtered fuel. The end cap 61 has a central opening 64 that serves as a support for the upper end 65 of a center tube 66. In other respects, the cartridge 60 is similar to the cartridge 10 described hereinbefore.

While we have illustrated our invention in connection with a specific type of filter element which is used in a specific environment, it will be apparent that modifications can be made without departing from the spirit and the scope of our invention.

We claim:

1. A filter element adapted to be contained within a two part fluid filter enclosure having facing sealing surfaces and defining fluid inlet and fluid outlet means comprising a pleated annular filter body having longitudinally extending inner and outer pleats, an imperforate center tube disposed coaxially with said pleats and spaced radially inwardly from said inner pleats to define an annular fluid chamber in the space between said center tube and said pleated annular filter body, a first end cap affixed to one end of said filter body and forming a seal therewith, said first end cap being in sealing engagement with the respective end of said center tube for closing said fluid chamber at said end, and a second end cap affixed to the other end of said filter body for effecting a seal therewith, said second end cap having a pliant portion extending radially outwardly beyond said outer pleats, said pliant portion being adapted to be engaged between the facing sealing surfaces of the filter enclosure parts to form a sealing gasket therefor and for supporting said filter element therefrom, said second end cap forming a fluid passage in communication with said fluid chamber and being adapted to communicate with one of the fluid means defined by the filter enclosure, one end of said center tube being adapted to communicate with the other fluid means of the filter enclosure for radial fluid flow through said pleated annular filter body.

2. A filter element as set forth in claim 1 wherein the second end cap terminates radially inwardly of the pleated annular filter body and radially outwardly of the center tube to define the fluid passage.

References Cited by the Examiner

UNITED STATES PATENTS

| 2,159,196 | 5/1939 | Babitch | 210—438 |
| 2,772,001 | 11/1956 | Bowers | 210—439 X |
| 2,902,162 | 9/1959 | Humbert et al. | 210—438 |

FOREIGN PATENTS

| 145,990 | 5/1936 | Austria. |
| 999,955 | 2/1952 | France. |
| 789,280 | 1/1958 | Great Britain. |

REUBEN FRIEDMAN, *Primary Examiner.*

HERBERT L. MARTIN, *Examiner.*